T. J. STOCKTON.
STOCK FEEDING DEVICE.
APPLICATION FILED JAN. 17, 1918. RENEWED DEC. 31, 1918.
1,293,972.
Patented Feb. 11, 1919.
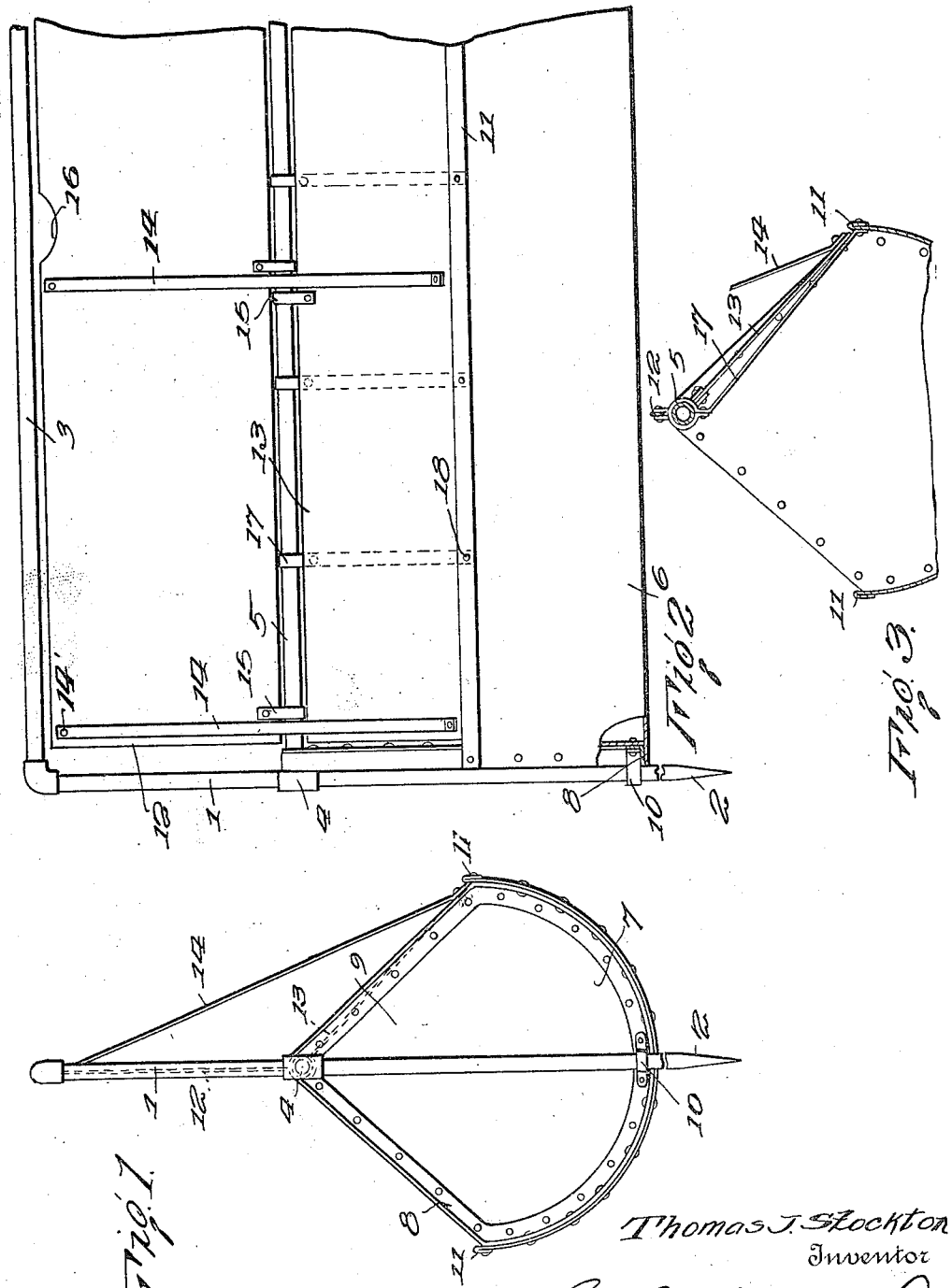

UNITED STATES PATENT OFFICE.

THOMAS J. STOCKTON, OF BURKE, VIRGINIA.

STOCK-FEEDING DEVICE.

1,293,972.     Specification of Letters Patent.     Patented Feb. 11, 1919.

Application filed January 17, 1918, Serial No. 212,260. Renewed December 31, 1918. Serial No. 269,172.

*To all whom it may concern:*

Be it known that I, THOMAS J. STOCKTON, a citizen of the United States, residing at Burke, in the county of Fairfax and State of Virginia, have invented certain new and useful Improvement in Stock - Feeding Devices, of which the following is a specification.

This invention relates to animal husbanding devices and the invention has more especial reference to an improved stock feeding trough.

The invention has for its principal object to provide a stock feeding trough, so arranged and constructed as to exclude the animals therefrom during the placing of food therein and as a consequence, preventing the wasting of the food and the overcrowding of the animals in their attempts to get the food.

Another and equally important object of the invention is to provide a trough of the character mentioned having means which not only serve to exclude the animals therefrom, at times, but also serve as an effectual barrier or fence, thus, allowing the same to be placed in an open portion of a pen or other inclosure and permitting the food to be easily placed in the trough by a person, as well as effecting a saving in fencing material.

Among other aims and objects of the invention may be recited, the provision of a device of the character mentioned with a view to compactness and in which the number of parts are few, the construction simple, the cost of production small, and efficiency in operation high.

The improvements in the details and arrangement of parts will be apparent from an inspection of the accompanying drawings, in connection with the specific description hereinafter contained and wherein the preferred embodiment of the invention is shown for the purpose of imparting a full understanding of the present invention.

In the drawings:

Figure 1 is an end elevation of the improved trough having parts broken away.

Fig. 2 is a fragmental front elevation thereof having parts broken away and shown in section, and Fig. 3 is a fragmentary transverse section therethrough.

Having more particular reference to the drawings, in connection with which like reference characters will designate corresponding parts throughout the several views, the improved device includes spaced vertical rods 1, the lower ends of which are tapered at 2 and obviously, are adapted to be engaged in the earth or other suitable support. The upper ends of the several rods are provided with elbows which in turn are engaged by the opposite ends of a longitudinally disposed bracing rod 3. T-fittings 4 are arranged on the intermediate portions of the several rods 1 and receive therein the opposite ends of a second longitudinally disposed rod 5, this rod serving as means for rotatably supporting the combined barrier and shield hereinafter more fully described.

A curved trough 6 formed of metal or other suitable material is provided and is secured to end pieces 7, which pieces as will be noted, are provided with reinforcing strips of angle iron 8, said strips being secured to the pieces adjacent their marginal portions by rivets or other suitable fastening devices. As will be noted the upper extremities of the several end pieces are tapered as at 9, to form a support for cover members and prevent the stock from having access to the trough at the ends. Metal straps 10 are secured to the lower portions of certain of the angle iron strips and are adapted to be engaged about the adjacent portions of the several vertically disposed rods 1. Obviously, the laterally disposed portions of the angle iron strips serve as means for permitting the fastening of the adjacent ends of the curved trough thereto by rivets or like fastening devices as clearly shown in the Fig. 1. To prevent the cutting of the stock by the sharp marginal portions of the trough 6, the same may be and preferably are turned or bent upon themselves as indicated by the numeral 11, thus, providing an efficient protective heading therefor.

Combined shields and barriers 12 and 13 are rotatably mounted on the longitudinally disposed rod 5 by bracket arms 15, the outer ends of which, obviously, are provided with bearing portions adapted for reception of said rod 5. To rigidify the several elements 12 and 13 and to maintain the same in spaced apart relation, bracing arms 14 are disposed transversely of the same and are connected thereto at their opposite ends by rivets 14' or the like. Of course, any number of these arms 14 may be employed, it however being preferable that the same be arranged to permit the ready cleaning of the elements 12 and 13 as it becomes necessary. In order that the element 12 may be readily engaged so that it might be raised from over its respective portions over the trough 6, a hand opening 16 is formed in one portion thereof.

With a view toward providing means for preventing the crowding of the stock and the even distribution of the food, partition strips 17 are engaged with the longitudinally disposed rod and one side of the trough 6 as at 18.

When using my improved stock feeding trough, the element 12 is moved to its uppermost position whereas it will be in substantial alinement with the vertical rod 1, while the element 13 will be in its closed position over that side of the trough 6 exposed to the stock. The food is now placed in the trough by way of the opposite side thereof, whereupon the element 12 is now moved downwardly to a position over its respective side of the trough 6, thus, removing the element 13 from the opposite side of said trough and allowing the stock to get the food therein. Inasmuch as the trough 6 is partitioned by the strips 17, it will be readily understood that overcrowding of the same during the feeding will be prevented. Further, by rounding the bottom of the trough 6, the stock will be prevented from climbing thereinto, and wasting the food. Attention is also directed to the manner in which the combined shields and barriers are engaged over their respective sides of the trough 6 when in lowermost positions. The free ends of each of the same are so arranged as to lie flush with the adjacent edges of the trough 6 and therefore, the forcing of the same upwardly by the stock will be positively prevented.

Since the element 12 will be in its raised position when the element 13 is in its closed position over one side of the trough 6, it will be readily understood that an effectual barrier is afforded. When the element 12 is moved to its closed position, the element 13 then assumes an upright position, thereby maintainng the barrier and preventing the escape of the stock. In this way, the trough may be arranged at an open portion of the pen or other inclosure and a person may readily place the food therein upon the moving of the element 12 to its upright or open position. A saving of fencing material is also effected by this arrangement.

Manifestly, the construction shown is capable of considerable modification and such modification as is within the scope of my claims, I consider within the spirit of my invention.

I claim:—

1. A stock feeding device comprising spaced supporting rods having the upper ends thereof interconnected, a longitudinally disposed rod connected to said supporting rods intermediate their ends, a trough arranged between the rods and secured to the same in proximity to the lower ends thereof, a plurality of division strips connected in spaced relation to the longitudinally disposed rod and to one side of said trough, and a combined barrier and shield pivotally mounted on the longitudinally disposed rod and adapted to be alternately engaged over its respective portions of said trough.

2. A stock feeding device comprising spaced supporting rods having the upper ends thereof interconnected, a longitudinally disposed rod connected to the supporting rods intermediate their ends, a trough having a curved bottom secured to the rods at points in proximity to the lower portions thereof, a plurality of division strips connected to the longitudinally disposed rod and one side of said trough, and a substantially V-shaped barrier and shield pivotally mounted on said longitudinally disposed rod and adapted to be alternately engaged over its respective portions of said trough.

In testimony whereof I affix my signature hereto.

THOMAS J. STOCKTON.

Copies of this patent may be obtained for five cents each, by addressing the "Commissioner of Patents, Washington, D. C."